No. 795,026. Patented July 18, 1905.

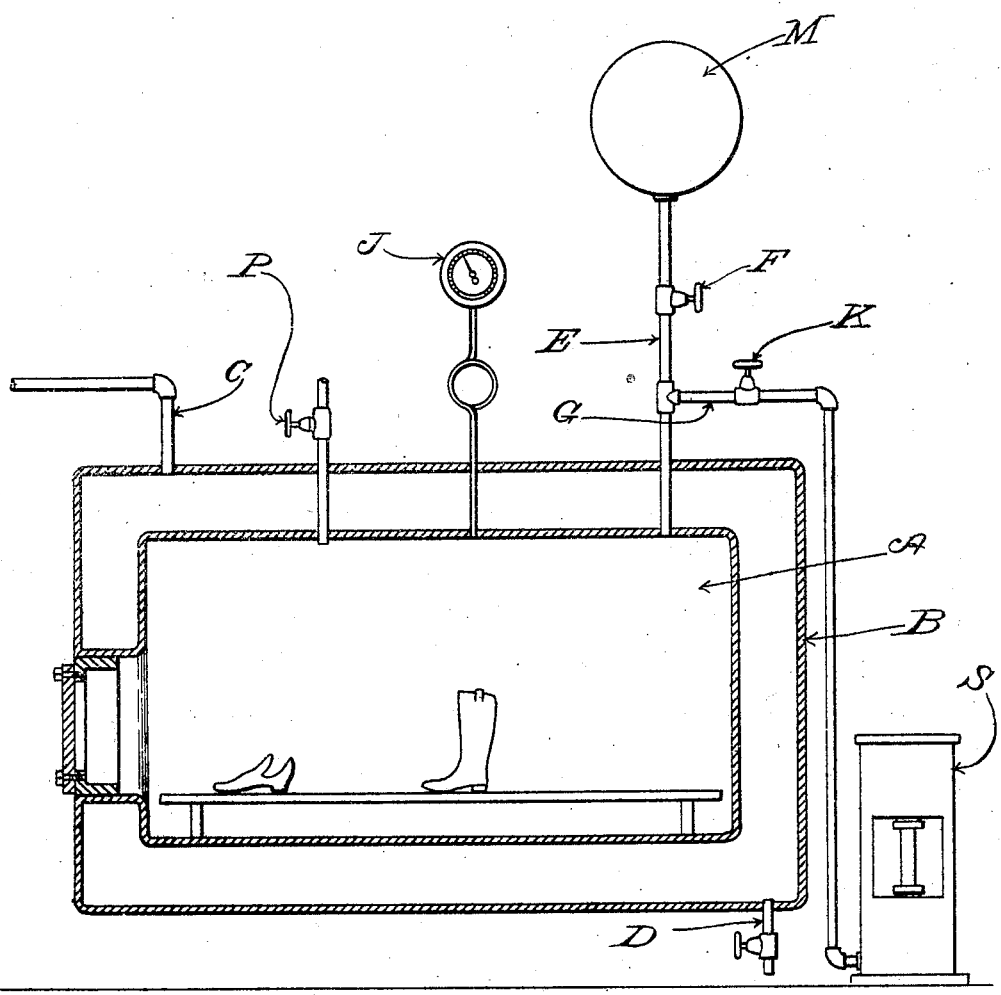

UNITED STATES PATENT OFFICE.

ALLEN L. COMSTOCK, OF BOSTON, MASSACHUSETTS, ASSIGNOR TO BOSTON RUBBER SHOE COMPANY, OF BOSTON, MASSACHUSETTS, A CORPORATION OF MASSACHUSETTS.

PROCESS OF VULCANIZATION.

SPECIFICATION forming part of Letters Patent No. 795,026, dated July 18, 1905.

Application filed December 19, 1903. Serial No. 185,839.

*To all whom it may concern:*

Be it known that I, ALLEN L. COMSTOCK, a citizen of the United States, residing at Boston, in the county of Suffolk, State of Massachusetts, have invented a certain new and useful Improvement in Processes of Vulcanization, of which the following is a specification, reference being had therein to the accompanying drawing.

My invention has for its object an improvement in process of vulcanization of rubber and allied gums.

The invention is fully set forth in the following description, and the novel features thereof are pointed out and clearly defined in the claims at the close of this specification.

The accompanying drawing shows one form of apparatus by the employment of which my process may be practiced.

In vulcanizing by the usual dry-heat process commonly employed the articles to be vulcanized are placed in an oven or heater which is provided with suitable heating means for raising the temperature within the oven to the required degree of heat. The articles are placed within the oven and are enveloped in an atmosphere of air while they are being vulcanized. As the heat is applied any vapor which may exist in the rubber or compound of which the articles are composed, is formed into vapor, and there are also formed or liberated in the rubber, or composition, certain gases as the heating proceeds. This vapor or the gases which are liberated frequently form what are termed "blisters" on the surface of the article, unless great care is taken in the application of heat, especially about the time when the temperature reaches the boiling-point of water and the melting-point of sulfur. This dry-heat process requires a considerable length of time—usually from six to eight hours—and great care in practicing it. To simplify the process of vulcanization and to reduce the time required, it has been proposed to obviate the blistering of the articles being vulcanized by subjecting them to pressure during vulcanization, thus permitting the necessary heat to be applied more quickly. Pressure may be applied to the air within the heater by means of a pump, or the pressure may be obtained by the employment of certain chemicals which are put into the heater in the form of a salt—for example, before the process of vulcanization begins—and which by means of the heat applied to vulcanize the articles is decomposed, forming a gas which operates to put the articles which are being vulcanized under a degree of pressure which varies in proportion with the quantity of the gas liberated. It has also been proposed to vulcanize in an atmosphere of a non-oxidizing or inert gas—such, for example, as carbon dioxid—either in the presence of pressure or without any additional pressure other than that which may result from the expansion of the gas by heat. This latter method while effective increases the cost of vulcanization because of the cost of the non-oxidizing gas which is employed.

By the employment of my process hereinafter set forth I am enabled to obtain the substantial advantages resulting from vulcanization in a surrounding or enveloping atmosphere of non-oxidizing or inert gas under pressure while at the same time reducing the cost of such vulcanization.

In practicing my process I employ a heater or oven, (shown in the drawing at A,) which may be constructed in any well-known manner to enable it to withstand internal pressure. The oven A is provided with means by which the temperature within the oven may be raised as desired. In the drawing I have shown the oven as jacketed at B, the jacket being entered by a steam-inlet pipe C and having a drip at D. By this means steam may be used in heating the oven; but any well-known means for heating the oven may, however, be employed.

The oven is provided with an inlet-pipe E, which leads from a tank M or other source of supply of a non-oxidizing or inert gas—such, for example, as carbon dioxid—which is under pressure. The said inlet-pipe E is provided with a cock F, by means of which the non-oxidizing gas under pressure in the tank may be admitted to the heating chamber or oven A. The inlet-pipe E is also connected with a pipe G, the other end of which is connected with an air-pump S, by means of which air may be pumped into the heater or oven A. A cock K is provided in the air-inlet pipe, by means of which the said pipe may be closed.

The rubber shoes or other articles to be vulcanized are placed within the heater and the opening H thereof closed and fastened. The cock F is then opened and the carbon dioxid or other non-oxidizing gas is permitted to pass from the tank, where it is contained under pressure, into the heater A until the gage J on the heater indicates a pressure of fifteen pounds to the square inch. The cock F is then closed and the cock K opened, and by means of the air-pump air is pumped into the heater A until the gage indicates a pressure of thirty pounds. The atmosphere within the heater will then consist substantially of one-half non-oxidizing gas and one-half air under a pressure of thirty pounds to the square inch. While the heater is thus being provided with the proper atmosphere, heat may be applied, (or the application of heat may be delayed until the proper atmosphere under the required pressure has been obtained,) and the heat may be raised quickly to a proper vulcanizing temperature—say 270° Fahrenheit. It is important that the required pressure be on the heater before the rise in temperature is such as to cause the formation of vapor or steam or the liberation of gas, since otherwise blisters might result on the surfaces of the rubber articles. The articles are allowed to remain under these conditions of heat and pressure for a sufficient length of time, usually from one to two hours, depending somewhat upon the character of the articles being treated, until they are properly vulcanized. The pressure is then removed, a cock or valve P being provided for this purpose, and the vulcanizer or heater opened and the articles removed.

I have found that articles vulcanized in the manner hereinabove described are of largely increased value as compared with articles which are vulcanized in an atmosphere of air, and I believe them to be substantially as valuable as, if not more valuable than, articles which are vulcanized in an atmosphere consisting wholly of the non-oxidizing gas. I do not intend herein to limit myself to the proportions named of non-oxidizing gas and air or to the specific pressures and temperatures named, as these may be varied within certain well-known limits. I have found that a substantial admixture of non-oxidizing gas with air is very advantageous as a vulcanizing atmosphere and that the pressures, temperatures, and times require substantial variations, according to circumstances.

The essential of my process is the employment of an atmosphere made up of a substantial proportion of non-oxidizing gas mixed with air and maintained during vulcanization under pressure. This atmosphere I do not find possible to obtain by decomposition of a salt or other chemical, as such an atmosphere contains other ingredients. My best results have been obtained by using commercially pure carbonic-acid gas, which is allowed to pass from a tank containing it under pressure into the heater or oven and is then followed by the admission of air into the heater or oven, a sufficient amount of the latter being forced into the heater or oven until the pressure within the same has reached thirty pounds or thereabout, or the air may be first admitted to the heater to be followed after a certain pressure has been reached—say fifteen pounds to the square inch—by the gas. The presence of a substantial proportion of non-oxidizing gas in the heater operates presumably to prevent oxidation of the rubber, and hence to improve the product. The air in the admixture has, I believe, no deleterious effect, while serving to economically obtain the pressure necessary to prevent blistering.

What I claim is—

1. The process of vulcanizing rubber or allied gums which consists in heating the articles to be vulcanized in the presence of a surrounding atmosphere under pressure, said atmosphere consisting of a mixture of non-oxidizing gas and air, substantially as described.

2. The process of vulcanizing rubber or allied gums which consists in heating the articles to be vulcanized in the presence of a surrounding atmosphere under pressure, said atmosphere consisting of a mixture of non-oxidizing gas and air in substantially equal proportions, substantially as described.

3. The process of vulcanizing rubber or allied gums which consists in surrounding the articles to be vulcanized by an atmosphere of non-oxidizing gas under pressure, raising the same to a substantially higher pressure by the admission of air under pressure thereby producing an admixture of air and the non-oxidizing gas, and heating the articles to be vulcanized in the said admixture, substantially as described.

4. The process of vulcanizing rubber or allied gums which consists in surrounding the articles to be vulcanized by an atmosphere consisting of an admixture of non-oxidizing gas and air under pressure, and applying the necessary heat thereto, said admixture being obtained by first admitting one of the ingredients to the heater under pressure and then forcing into the heater the other ingredient until the required pressure is obtained, substantially as described.

In testimony whereof I affix my signature in presence of two witnesses.

ALLEN L. COMSTOCK.

Witnesses:
WM. A. MACLEOD,
ALICE H. MORRISON.